(12) United States Patent
Retailleau et al.

(10) Patent No.: US 8,961,213 B2
(45) Date of Patent: Feb. 24, 2015

(54) LOCKABLE CONNECTOR

(75) Inventors: Xavier Retailleau, Cholet (FR); Christian Le Tortorec, Cholet (FR); Matthieu Deffois, Cholet (FR); Damien Pelissier, Cholet (FR); Adam Saaidy, Villabe (FR)

(73) Assignee: Thales, Neuilly sur Seine (FR)

( * ) Notice: Subject to any disclaimer, the term of this patent is extended or adjusted under 35 U.S.C. 154(b) by 88 days.

(21) Appl. No.: 13/699,284

(22) PCT Filed: May 20, 2011

(86) PCT No.: PCT/FR2011/051148
§ 371 (c)(1),
(2), (4) Date: Apr. 14, 2013

(87) PCT Pub. No.: WO2011/144877
PCT Pub. Date: Nov. 24, 2011

(65) Prior Publication Data
US 2013/0210258 A1    Aug. 15, 2013

(30) Foreign Application Priority Data
May 20, 2010   (FR) ...................................... 10 02133

(51) Int. Cl.
*H01R 4/50* (2006.01)
*H01R 13/639* (2006.01)
(Continued)

(52) U.S. Cl.
CPC .......... *H01R 13/639* (2013.01); *H01R 13/6276* (2013.01); *H01R 13/631* (2013.01); *F16B 17/00* (2013.01); *H01R 13/2421* (2013.01); *H01R13/5219* (2013.01); *H01R 13/533* (2013.01); *H01R 2201/26* (2013.01)
USPC ....................................................... 439/345

(58) Field of Classification Search
CPC .. F16B 17/00; H01R 13/6276; H01R 13/631; H01R 13/639; H01R 13/2421; H01R 13/5219; H01R 13/533; H01R 2201/26; H01R 2105/00; H01R 24/005; H01R 23/7073; H01R 23/02; H01R 23/725; H01R 13/26; H01R 13/658
USPC .................................................. 439/345, 660
See application file for complete search history.

(56) References Cited

U.S. PATENT DOCUMENTS 1,632,599 A * 6/1927 Hayward ...................... 439/256
2,726,372 A * 12/1955 Appleton ........................ 439/21
(Continued)

FOREIGN PATENT DOCUMENTS

FR       2651614 A1    3/1991
FR       2924277 A1    5/2009

*Primary Examiner* — Edwin A. Leon
(74) *Attorney, Agent, or Firm* — Davidson, Davidson & Kappel, LLC

(57) ABSTRACT

A connection assembly is provided. The connection assembly includes a socket with connection pins, a plug with matching connection pins and a locker for locking the plug relative to the socket while the matching pins are engaged. The lock includes a bolt having a barrel provided with balls movable between a locking position projecting in relation to the barrel and a position retracted inside the barrel, and a rod for retaining the balls in the locking position. The locker also includes a shaft arranged in the plug or the socket for at least partially receiving the bolt and having a groove for receiving the balls in the locked and projecting position. The bolt further includes a spring for returning the rod toward the ball-retaining position, and the rod has a cam surface pushing the balls back into the locked position when the spring urges the rod towards the retaining position.

6 Claims, 2 Drawing Sheets

(51) Int. Cl.
*H01R 13/627* (2006.01)
*H01R 13/631* (2006.01)
*F16B 17/00* (2006.01)
*H01R 13/24* (2006.01)
*H01R 13/52* (2006.01)
*H01R 13/533* (2006.01)

(56) References Cited

U.S. PATENT DOCUMENTS

| | | | |
|---|---|---|---|
| 5,002,500 | A | 3/1991 | Zuccaro et al. |
| 6,375,378 | B1 * | 4/2002 | Kitaura .......... 403/31 |
| 2007/0167072 | A1 | 7/2007 | Kohen |
| 2009/0137153 | A1 | 5/2009 | Yoshioka et al. |

* cited by examiner

LOCKABLE CONNECTOR

The present invention relates to a connection assembly including a socket provided with connection pins, a plug provided with matching connection pins and suitable for being inserted on the socket and a means for locking the plug relative to the socket while the matching pins are engaged.

BACKGROUND

Many applications require having connection means allowing quick locking and unlocking. This is for example the case for the connection of auxiliary members such as a control keyboard or joystick in a vehicle, for example an airplane, helicopter, or land-based vehicle. The connection means must be able to be engaged or disengaged by the vehicle's pilot while the latter performs other driving functions, such that they must be able to be maneuvered with one hand. Furthermore, these connection means must provide a reliable connection despite the vibrations of the environment.

Such connectors are generally qualified as "push/pull" connectors. These connectors are traditionally cylindrical and have a relatively significant axial bulk, corresponding to the engagement direction.

Rectangular connectors have been considered with lateral locking mechanisms.

This connector nevertheless has the drawback of being poorly suited to harsh environments (sandstorms, mud) and having excessively large dimensions.

SUMMARY OF THE INVENTION

An objection of the present invention provides a connection assembly that may have increased reliability and reduced dimensions, and may be implemented by a user using one hand.

The present invention provides a connection assembly including a socket provided with connection pins, a plug provided with matching connection pins and suitable for being inserted on the socket and a means for locking the plug relative to the socket while the matching pins are engaged, the locking means including:

a bolt secured either to the plug or the socket, said bolt comprising a barrel provided with balls movable between a locking position in which said balls are projecting in relation to the barrel and a position in which said balls are retracted inside the barrel, and a rod for retaining the balls in the locking position thereof, said rod being movable relative to the barrel between a position in which the balls are released and a position in which the balls are retained in the locked and projecting position thereof, a shaft arranged in the other one of the plug or the socket, said shaft being suitable for at least partially receiving the bolt and having a groove for receiving the balls in the locked and projecting position thereof.

According to specific embodiments, the connection assembly may comprise one or more of the following features:

said connection assembly comprises a spring for returning the rod toward the ball-retaining position thereof, and the rod has a cam surface suitable for pushing the balls back into the locked position thereof when the spring urges the rod towards the retaining position thereof, the spring is such that, when the rod is moved in order to release the balls, the return force exerted by the spring is less than the sum of the separating forces exerted between the plug and the socket;

the connection assembly comprises a sealing ring surrounding the complementary pins gripped between the socket and the plug when they are coupled, said ring being able to exert a separating force between the coupled plug and socket;

the locking means comprise a single bolt and a single shaft, each positioned at the center of the assembly of the pins of the plug and the socket;

the connection pins of one of the socket and the plug are elastic piston contacts.

The present invention also provides a connection plug provided with electrical connecting pins and capable of being engaged on a socket provided with complementary electric connection pins, the plug comprising a bolt for locking the plug relative to the socket when the complementary pins are in contact, characterized in that the bolt comprises a barrel provided with balls movable between a locking position in which said balls are projecting in relation to the barrel and a position in which said balls are retracted inside the barrel, and a rod for retaining the balls in the locking position thereof, said rod being movable relative to the barrel between a position in which the balls are released and a position in which the balls are retained in the locked and projecting position thereof.

BRIEF DESCRIPTION OF THE DRAWINGS

The invention will be better understood upon reading the following description, provided solely as an example and done in reference to the drawings, in which.

DETAILED DESCRIPTION

Figure 1:
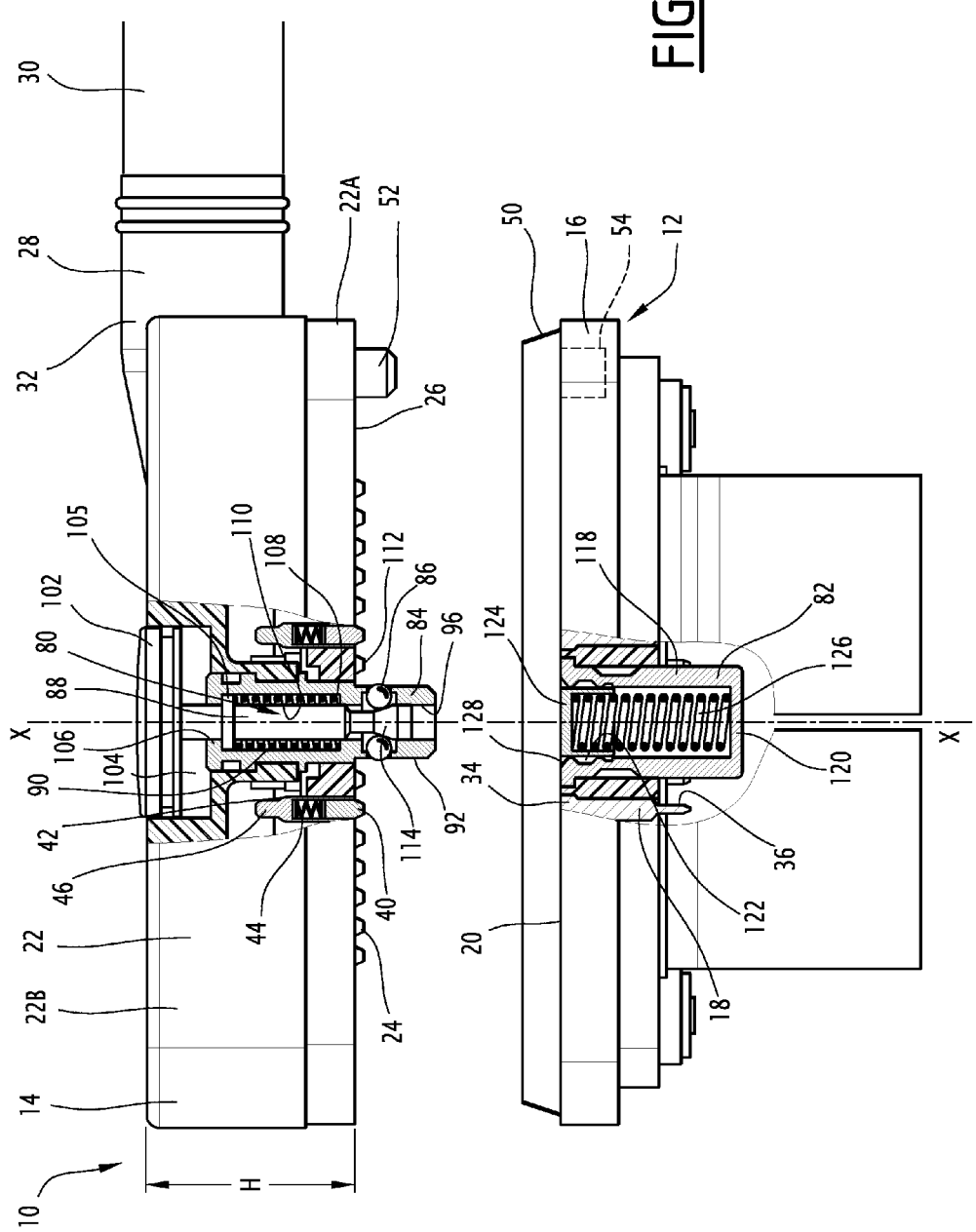
FIG. 1 is a side view of the disengaged connecting assembly with a partial cutaway.
Figure 2:
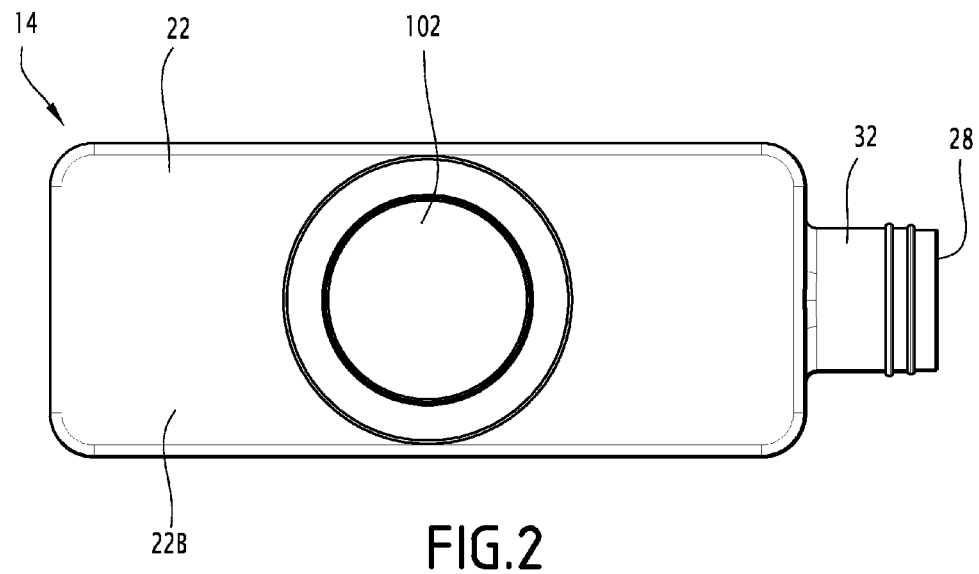
FIG. 2 is a top view of the connecting plug.
Figure 3:
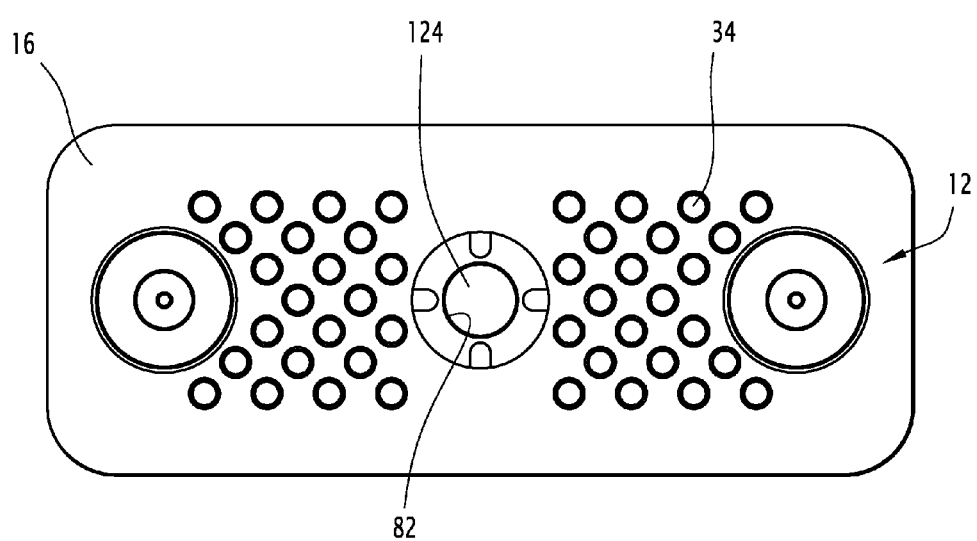
FIG. 3 is a top view of the socket.

The connection assembly 10 illustrated in FIG. 1 comprises a socket 12 and a plug 14 that can be engaged on the socket 12. The socket comprises a base 16 can be fastened, in particular by screwing or riveting, on a wall of a housing. The base 16 supports a set of connection pins 18 along with an exposed coupling surface 20 on which the plug 14 can be attached.

The plug 14 has a housing 22 made up of an assembled base 22A and cover 22B. This housing 22 bears a set of connection pins 24, each corresponding to the connection pins 18. The pins 24 merge along a coupling surface 26 complementary to the coupling surface 20 of the socket.

The housing 22 laterally has an opening 28 for the passage of the cable for an electrical cable 30 containing independent conductors each connected to a pin 24.

Advantageously, the housing 22 is in the form of a rectangular rhomboid, such that the height H, measured perpendicular to the coupling surface 26, i.e. along the engagement direction X-X of the plug on the socket, is reduced and more specifically less than half, and advantageously a quarter, the largest length of the coupling surface 26. In the considered example, the height H is approximately 15 mm.

The passage 28 for inserting the cable 30 extends in the height of the housing 22, i.e. for the most part in the bulk of the housing 22. In the illustrated embodiment, the cable 30 penetrates through a guide sleeve 32 laterally extending the housing 22 and opening perpendicular to the direction X-X.

The complementary connection pins 18 and 24 are distributed along a regular matrix grid on the plug and the socket. The pins are distributed in two groups symmetrical to one another positioned on either side of the median axis of the plug and the socket. Two coaxial connectors are also provided at the ends of the plug and the socket.

The pins 18 are each made up of a metal part permanently fastened to the base 14, each pin having, along the coupling surface 20, a bearing surface 36 for a complementary pin 24 of the plug and, at the other end, a connecting tab 36 for a conductor, in particular by welding.

Advantageously, each connection pin 24 of the plug is made up of the elastic piston contacts, i.e. the pin comprises a metal slug 40 slidingly movably mounted in a cylindrical casing 42 secured to the housing 14 with the compressed spring 44 inserted between the bottom of the casing 42 and one end of the slug 40. This spring can urge the slug 40 toward the outside of the casing toward the complementary contact 18 with the socket. The slug 40 is retained relative to casing 42 by a narrower end of the casing 42 to prevent it from completely disengaging therefrom.

The casing 42 comprises an electrical connection tab 46 for connecting to a conductor of the cable 30 or printed circuit.

Alternatively, the fixed contacts are borne by the plug 14, while the elastic piston contacts are borne by the socket 12.

The coupling surface 20 of the base 14 is bordered by an elastic ring 50 that can bear on the corresponding coupling surface 26 of the plug 14. This peripheral ring 50 surrounds the connecting pins and seals the connector. It is also capable of exerting a separating force between the socket 12 and the plug 14.

A positioning slug 52 is provided on one of the plug 14 and the socket 12 and protrudes relative to the coupling surface, a complementary housing 54 for receiving said slug being provided in the other of the plug and the socket.

To ensure reliable locking of the plug relative to the socket, the plug 14 is equipped with a locking member 80 forming a bolt capable of engaging in a strike 82 formed in the base 16 of the socket 12.

The locking member 80 is positioned substantially at the center of the plug 14 and is arranged between the two groups of pins 24, thereby distributing them equally on either side.

The locking member comprises a barrel 84, a crown of balls 86 movable relative to the barrel in which they are retracted or relative to which they project radially, a sliding rod 88 for immobilizing the balls 86 in their projecting position, and a return spring 90 for returning the rod to its projecting ball-retaining position.

More specifically, the barrel 84 is generally cylindrical and has one end 92 forming a peg protruding relative to the connecting surface 26. The barrel 84 is immobilized using any suitable means relative to the housing 22. To that end, it is for example gripped between the base 22A and the cover 22B forming the housing. The barrel 84 is received in a piercing passing all the way through the housing 22. The barrel 84 is passed through by a bore 96 in which the rod 88 is slidingly mounted.

The rod 88 can be slidingly moved in the bore 96 perpendicular to the coupling surfaces 20 and 26 in the engagement direction X-X.

Four radial through openings connect the side surface of the barrel in the projecting region to the bore 96. These openings form housings in each of which a ball 86 is received movable between a projecting position relative to the side surface of the barrel and a position partially retracted into the thickness of the barrel and the bore 96. The opening receiving the balls has, at its end opening on the outer surface of the barrel, a section smaller than the section of the balls, thereby preventing them from escaping.

The rod 88 extends beyond the barrel 84 across from the peg 92. At that end, the rod is extended by a manual pushbutton 102 to make it possible to push the body into the barrel along direction X-X. A recess 104 for receiving the button 102 is formed in the cover 22B of the housing.

The rod 88 has, in front of the button 102, a flange 104 for forming a stop capable of bearing on a shoulder 106 formed at the corresponding through end of the bore 96.

The spring 90 is compressed between said flange 105 and a bearing surface 108 of the barrel, the spring being received in a counter-bore 110 formed inside the barrel. The shoulder 106 capable of cooperating with the flange 105 forms a stop for immobilizing the button 102 against the action of the spring 90 in a position locking the plug on the socket and retaining the balls. In that position, the button 102 is flush with the surface of the housing 22 of the plug.

Spaced away from its other end, the rod 88 has a segment with a reduced section 112 delimited on the side opposite the button 102 by a tapered cam surface 114 for urging the balls 86 toward their projecting locking position.

The strike 82 delimits the shaft and is formed by a cylindrical bush 118 attached on the base 16. This bush has an inner shape of revolution and has a bottom 120 opposite its open and capable of receiving the mental 92.

On its inner surface, the well 82 has a groove 122 for receiving the balls 86 when they are in their projecting position and the peg is engaged in the strike.

A retractable stopper 124 for covering the shaft is movably slidingly mounted inside the passage delimited by the bush 82. The stopper 124 is urged by a spring 126 kept compressed between the bottom 120 and the stopper 124. Stops 128 for retaining the stopper 124 are formed at the end of the shaft in a position such that, in the absence of any urging, the stopper 124 is flush with the coupling surface 20.

The spring 90 is such that, when the rod 88 is moved to free the balls 86, the return force exerted by the spring 90 on the rod 88 is less than the sum of the separating forces exerted between the plug and the socket. In the considered example, these separating forces are the sum of the force resulting from the ring 50 and individual forces produced by each elastic piston contact 40.

The connector operates as follows.

To make the connection, the plug 14 is placed across from the base, with the end of the peg 92 placed at the entry of the shaft 82, and the slug 52 is placed across from the housing 54. A bearing force exerted by the operator on the exposed surface of the button 102 in the direction X-X causes the plug 14 and the socket 12 to come closer together. The bearing on the piece 102 creates a movement of the rod 88 that frees the balls 86. When the plug is in place and the pressure on the button 102 is removed, the balls lock in the groove 122.

During this movement, the balls 86, in contact with the side surface of the well 82, retract to the inside of the barrel 84 while pushing the rod 88 against the action of the spring 90 through the cam effect procured by the surface 114.

When the balls 86 are located across from the groove 122, the balls, under the action of the spring 90 transmitted by the rod 88 and the cam surface 114, move toward their locking projecting position while penetrating inside the groove 122.

The rod 88 is then in the locked position, prohibiting the balls 86 from returning to the inside of the barrel 84. In this way, the rod ensures positive locking between the plug 14 and the socket 12 through its action retaining the balls in position.

To separate the plug 14 and the socket 12, the operator exerts pressure on the button 102, leading to the movement of the rod 88 in direction X-X, such that the balls 86 are located across from the housing delimited by the section 112 with a reduced diameter of the rod. The balls 86 are then free to move toward their position retracted inside the barrel.

Under the action of the combined forces of the elastic piston contacts 40 and the ring 50, the plug 14 moves away from the socket 12 without it being necessary for the operator to intervene or release his pressure on the rod 88. The balls 86 then retract to the inside of the barrel 84 to allow the peg 92 to be removed from the shaft 82.

When the plug 14 and the socket 12 are separated, the spring 90 compresses further, which is possible owing to the reduced force exerted by the spring 90, the latter being, over the entire compression travel, less than the separating forces between the plug 14 and the socket 12.

What is claimed is:

1. A connection assembly comprising:
   a socket with connection pins;
   a plug with matching connection pins, the matching connection pins suitable for being inserted on the socket; and
   a locker for locking the plug relative to the socket while the matching pins are engaged, the locker includes:
      a bolt secured to one of the plug or the socket, the bolt includes a barrel provided with balls movable between a locking position projecting in relation to the barrel and a position retracted inside the barrel, a rod for retaining the balls in the locking position thereof, the rod being movable relative to the barrel between a position in which the balls are released and a position in which the balls are retained in the locked and projecting position thereof,
      a shaft arranged in the other one of the plug or the socket, the shaft being suitable for at least partially receiving the bolt and having a groove for receiving the balls in the locked and projecting position thereof, and
      the bolt includes a spring for returning the rod toward the ball-retaining position thereof, the rod having a cam surface suitable for pushing the balls back into the locked position thereof when the spring urges the rod towards the retaining position thereof,
      wherein when the rod is moved in order to release the balls, a return force exerted by the spring is less than a sum of the separating forces exerted between the plug and the socket.

2. The connection assembly according to claim 1, further comprising a sealing ring surrounding the complementary pins, gripped between the socket and the plug when the socket and plug are coupled, the ring being able to exert a separating force between the coupled plug and socket.

3. The connection assembly according to claim 1, wherein the locker comprises a single bolt and a single shaft, each positioned at the center of the assembly of the pins of the plug and the socket.

4. The connection assembly according to claim 1, wherein the connection pins of one of the socket and the plug are elastic piston contacts.

5. A connection plug provided with electrical connecting pins and capable of being engaged on a socket provided with complementary electric connection pins, the plug comprising:
   a bolt for locking the plug relative to the socket when the complementary pins are in contact, the bolt including:
      a barrel provided with balls movable between a locking position in which said balls are projecting in relation to the barrel and a position in which said balls are retracted inside the barrel, and
      a rod for retaining the balls in the projecting locking position thereof, said rod being movable relative to the bolt between a position in which the balls are released and a position in which the balls are retained in the locked and projecting position thereof,
      a spring for returning the rod toward the ball-retaining position thereof, the rod having a cam surface suitable for pushing the balls back into the locked position thereof when the spring urges the rod towards the retaining position thereof,
      wherein when the rod is moved in order to release the balls, a return force exerted by the spring is less than a sum of the separating forces exerted between the plug and the socket.

6. The connection assembly according to claim 2, wherein:
   the connection pins of one of the socket and the plug are elastic piston contacts,
   the separating forces are the sum of the force resulting from the sealing ring and individual forces produced by each elastic piston contact,
   when the rod is moved in order to release the balls, the plug moves away from the socket only under the action of the combined forces of the elastic piston contacts and of the sealing ring.

\* \* \* \* \*